(«12») United States Patent
Lee et al.

(10) Patent No.: US 12,313,330 B2
(45) Date of Patent: May 27, 2025

(54) REFRIGERATOR

(71) Applicant: LG ELECTRONICS INC., Seoul (KR)

(72) Inventors: Sanggyun Lee, Seoul (KR); Younseok Lee, Seoul (KR); Yongwon Dong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 18/020,027

(22) PCT Filed: Jul. 23, 2021

(86) PCT No.: PCT/KR2021/009559
§ 371 (c)(1),
(2) Date: Feb. 6, 2023

(87) PCT Pub. No.: WO2022/030834
PCT Pub. Date: Feb. 10, 2022

(65) Prior Publication Data
US 2023/0280085 A1    Sep. 7, 2023

(30) Foreign Application Priority Data

Aug. 7, 2020   (KR) .................. 10-2020-0099093

(51) Int. Cl.
*F25D 23/02*    (2006.01)
*E05F 1/12*     (2006.01)
*F16C 11/04*    (2006.01)

(52) U.S. Cl.
CPC .............. *F25D 23/028* (2013.01); *E05F 1/12* (2013.01); *F16C 11/04* (2013.01); *E05Y 2900/31* (2013.01); *F25D 2323/024* (2013.01)

(58) Field of Classification Search
CPC .... F25D 23/028; F25D 2323/024; E05F 1/12; E05F 1/1207; E05Y 2900/31
See application file for complete search history.

(56) References Cited

U.S. PATENT DOCUMENTS 5,896,619 A  *  4/1999  Koopman ............. E05F 1/1253
                                          16/68
10,584,524 B2    3/2020  Fang et al.
(Continued)

FOREIGN PATENT DOCUMENTS

CN    106766595 A    5/2017
JP    2001-173306 A  6/2001
(Continued)

*Primary Examiner* — Daniel J Rohrhoff
(74) *Attorney, Agent, or Firm* — Bryan Cave Leighton Paisner LLP

(57) ABSTRACT

A refrigerator includes: a cabinet having a storage space; a hinge bracket coupled to the cabinet; a door which is rotatably coupled to the shaft provided at the hinge bracket and which open/close the storage space; and an automatic closing device which is provided on the door at a position spaced away from the rotational center line of the door, and which is operated together with the hinge bracket when the door is being closed to automatically close the door. The automatic closing device includes a lever and an elastic member for elastically supporting the lever, and the hinge bracket includes: a bracket body including the shaft; and a cam member which is separably coupled to the bracket body and which has a contact surface that comes in contact with the lever when the door is being closed.

15 Claims, 19 Drawing Sheets

(56) References Cited

U.S. PATENT DOCUMENTS

| | | | | |
|---|---|---|---|---|
| 2004/0040118 A1* | 3/2004 | Han | ...................... | F25D 23/028 |
| | | | | 16/277 |
| 2006/0038412 A1* | 2/2006 | Muramatsu | ........... | E05F 1/1215 |
| | | | | 292/144 |
| 2006/0232176 A1* | 10/2006 | Kim | .......................... | E05D 3/12 |
| | | | | 312/401 |
| 2013/0154464 A1* | 6/2013 | Fiori | .................... | E05D 7/0423 |
| | | | | 16/303 |
| 2013/0264930 A1* | 10/2013 | Kim | .......................... | E05F 1/00 |
| | | | | 312/405 |
| 2014/0232251 A1 | 8/2014 | Kim et al. | | |
| 2017/0211304 A1* | 7/2017 | Fang | ................ | E05D 7/081 |
| 2020/0393190 A1* | 12/2020 | Choi | .................. | E05D 11/1007 |
| 2021/0363804 A1* | 11/2021 | Mitchell | ................... | E05D 3/02 |
| 2024/0044570 A1* | 2/2024 | Dong | ........................ | E05F 3/20 |
| 2024/0167754 A1* | 5/2024 | Lee | ........................ | E05D 7/081 |

FOREIGN PATENT DOCUMENTS

| | | |
|---|---|---|
| KR | 10-1999-0034855 A | 5/1999 |
| KR | 10-2007-0116504 A | 12/2007 |
| KR | 10-0874633 B1 | 12/2008 |
| KR | 10-1910655 B1 | 10/2018 |
| KR | 10-1978452 B1 | 5/2019 |

* cited by examiner

REFRIGERATOR

TECHNICAL FIELD

The present disclosure relates to a refrigerator.

BACKGROUND ART

In general, refrigerators are home appliances for storing foods at low temperature in an inner storage space covered by a refrigerator door. Here, the inside of the storage space is cooled using cool air that is generated by being heat-exchanged with a refrigerant circulated in a refrigeration cycle to store the foods in an optimal state.

The refrigerator may be independently placed in a kitchen or living room or may be accommodated in a space defined by a furniture cabinet of the kitchen.

As the refrigerator increases in size more and more, and multi-functions are provided to the refrigerator due to dietary life changes and pursues of high quality, refrigerators of various structures in consideration of user convenience are being brought to the market.

The refrigerator may include a cabinet defining a storage space and a door connected to the cabinet and having the storage space. A door storage portion for storing food may be provided in the door. When the door storage portion is provided, a lot of force is required for the user to close the door due to weight of the food stored in the door storage portion as well as a weight of the door itself.

In order for the user to easily close the door, recently, the refrigerator is provided with a hinge device for automatically closing the door when the door is closed at a certain angle.

An automatic return hinge device including a restoring device is disclosed in Korean Patent Registration No. 10-0874633.

In the document, the hinge device may include a body, a clutch device mounted inside the body, a shaft coupled to pass through the clutch device, and a first spring that transmits restoring force to the shaft when the door is closed.

The shaft serves to provide a rotational center of the door, and the first spring in the form of a coil spring is disposed in a direction parallel to the shaft.

In the case of the document, since the restoration device is disposed in a direction parallel to the rotational center of the door, a space for positioning the restoration device as high as the height of the restoration device is required in the door, and thus, there is a restriction in installing the restoration device.

In addition, the position of the rotational center of the door may vary according to a thickness of the door, and when the thickness of the door becomes thin, it may be impossible to install the restoration device in a direction parallel to the rotational center of the door.

SUMMARY

Embodiments provide a refrigerator provided with an auto closing device installed in a door regardless of a thickness of a door to provide closing force of the door.

Additionally or optionally, embodiments also provide a refrigerator in which a phenomenon, in which a door is closed and then is opened again due to excessive closing force of the door when the door is closed, is prevented from occurring by an auto closing device.

Additionally or optionally, embodiments provide a refrigerator in which a cam member including a contact surface of a hinge bracket is easily replaced when abrasion of the contact surface that is in contact with a lever occurs.

In one embodiment, a refrigerator includes: a cabinet having a storage space; a hinge bracket coupled to the cabinet; a door rotatably coupled to a shaft provided on the hinge bracket and configured to open and close the storage space; and an auto closing device installed in the door at a position spaced apart from a rotational center line of the door and configured to interact with the hinge bracket in a process of closing the door to automatically close the door. Thus, closing force may be provided to the door by using an auto closing device regardless of a thickness of the door.

The auto closing device may include a lever and an elastic member configured to elastically support the lever.

The hinge bracket includes: a bracket body provided with the shaft; and a cam member separably coupled to the bracket body and provided with a contact surface that is in contact with the lever in the process of closing the door. Therefore, when the abrasion of the contact surface occurs, the cam member including the contact surface may be easily replaced.

The contact surface may be provided so that, while a contact portion of the lever moves along a portion of the contact surface, the contact portion gets closer to the front surface of the cabinet, and while the contact portion moves along the other portion of the contact surface, the contact portion is away from the front surface of the cabinet. Thus, when the door is closed by the auto closing device, a phenomenon in which the door is closed and then opened again due to excessive closing force of the door may be prevented.

When a line perpendicular to the front surface of the cabinet while passing through the rotational center line of the door is a virtual line, the contact surface may include: a first surface inclined in a direction that is farther from the virtual line as the first surface is closer to the front surface of the cabinet; a second surface inclined in a direction that is closer to the virtual line as the second surface is closer to the front surface of the cabinet; and a third surface configured to extend in a direction that is closer to the virtual line as the third surface is farther from the front surface of the cabinet.

The cam member may include a first cam body and a second cam body coupled to the first cam body.

In a state in which a portion of the bracket body is disposed between the first cam body and the second cam body, the first cam body, the bracket body, and the second cam body may be coupled to each other.

The refrigerator may further include a coupling member coupled to the first cam body, the bracket body, and the second cam body.

The coupling member may be coupled to the first cam body, the bracket body, and the second cam body in a direction parallel to an extension direction of the shaft.

The first cam body may include a first coupling part that is in contact with the bracket body at one side of the bracket body and a first extension part extending from the first coupling part in a horizontal direction.

The second cam body may include a second coupling part that is in contact with the bracket body at the other side of the bracket body and a second extension part extending from the second coupling part in a horizontal direction.

One or more of the first extension part and the second extension part may be configured to define the contact surface.

The bracket body may include a through-hole, the first coupling part may include a coupling boss inserted into the through-hole, and the second coupling part may include a hole aligned with the coupling boss.

The first coupling part may be in contact with a top surface of the bracket body, and the second coupling part may be accommodated in an accommodation portion that is recessed from a bottom surface of the bracket body.

The first extension part and the second extension part may be coupled to each other by a coupling member in a state of being in contact with each other.

Each of the first coupling part and the second coupling part may include the first to third surfaces.

When the door is in the closed state, the contact portion of the lever may be maintained in a state of being in contact with the third surface.

After the cam member is coupled to the bracket body in a direction crossing the extension direction of the shaft, the coupling member may be coupled to the cam member and the bracket body in a direction parallel to the extension direction of the shaft.

The bracket body may include a recess portion that is recessed in a horizontal direction, and the first cam body may include a protrusion portion disposed in the recess portion.

The lever may rotate based on a rotational center line spaced apart from the rotational center line of the door. The elastic member may be a torsion spring.

In another embodiment, a refrigerator may include a door and an auto closing device configured to operate so that the door is automatically closed.

The auto closing device may include a lever configured to rotate based on a rotational center line spaced apart from the rotational center line of the door and an elastic member connected to the lever.

In the state in which the door is closed, the rotational center line of the door may be disposed closer to a front surface of the door than a rear surface of the door, and the rotational center line of the lever may be disposed closer to the rear surface of the door than the rotational center line of the door.

In the state in which the door is closed, a portion of the contact surface, which is in contact with the lever, may be disposed closer to the front surface of the door than the rotational center line of the lever.

The hinge bracket may include: a bracket body provided with the shaft configured to provide a rotational center of the door; and a cam member separably coupled to the bracket body and provided with a contact surface that is in contact with the lever in the process of closing the door.

According to the proposed embodiment, since the auto closing device is disposed to be spaced apart from the rotational center line of the door, even when the thickness of the door is reduced, the closing force may be provided to the door when the door is closed.

According to this embodiment, when the door is closed by the auto closing device, the phenomenon in which the door is closed and then opened again due to the excessive closing force of the door may be prevented from occurring.

According to this embodiment, since the cam member including the contact surface that is in contact with the lever is separably coupled to the hinge bracket, and the cam member is separated and replaced when the abrasion of the contact surface occurs, the replacement of the cam member may be easy, and service cost may be reduced.

DETAILED DESCRIPTION

Figure 1:
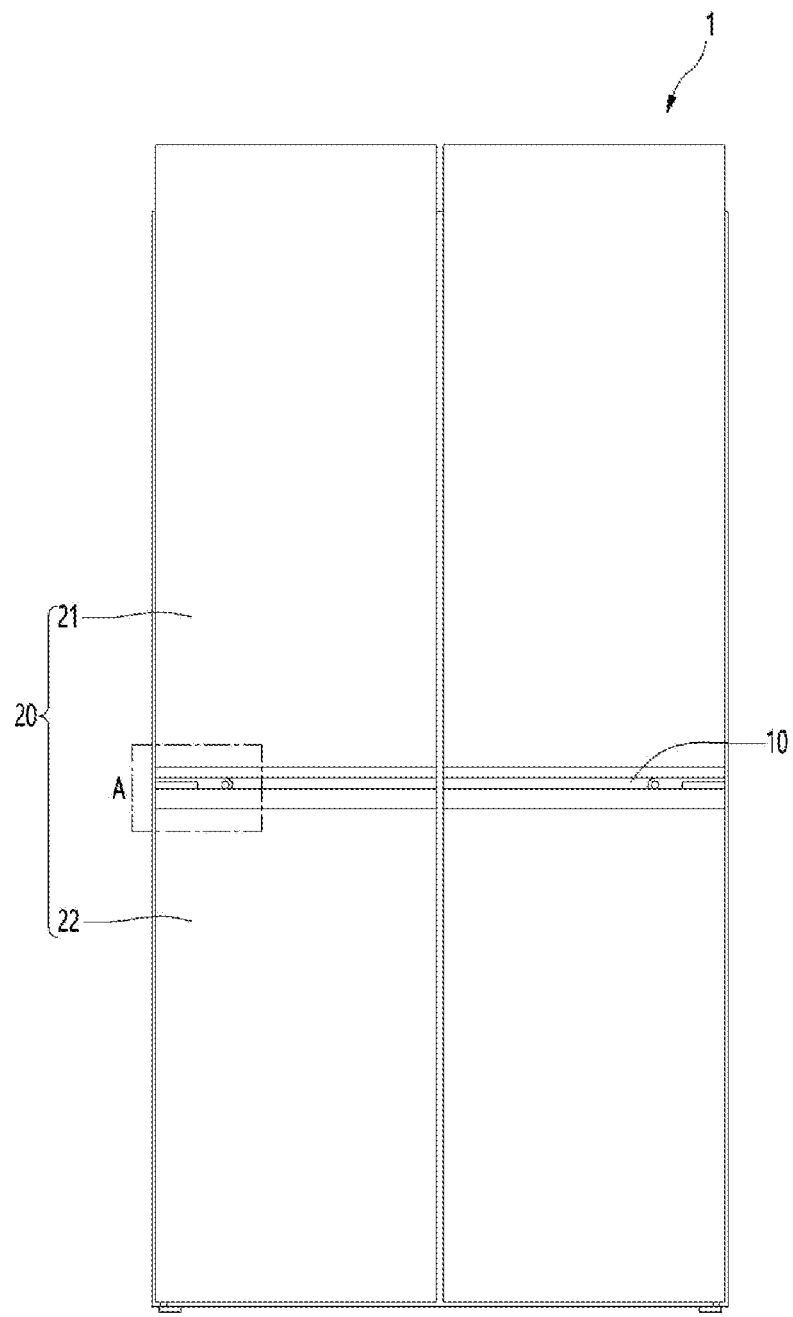
FIG. 1 is a front view of a refrigerator according to an embodiment.

Hereinafter, embodiments of the present disclosure will be described in detail with reference to the accompanying drawings. It should be noted that when components in the drawings are designated by reference numerals, the same components may have the same reference numerals even though the components are illustrated in different drawings. Further, in description of embodiments of the present disclosure, when it is determined that detailed descriptions of well-known configurations or functions obscure the understanding of the embodiments of the present disclosure, the detailed descriptions may be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
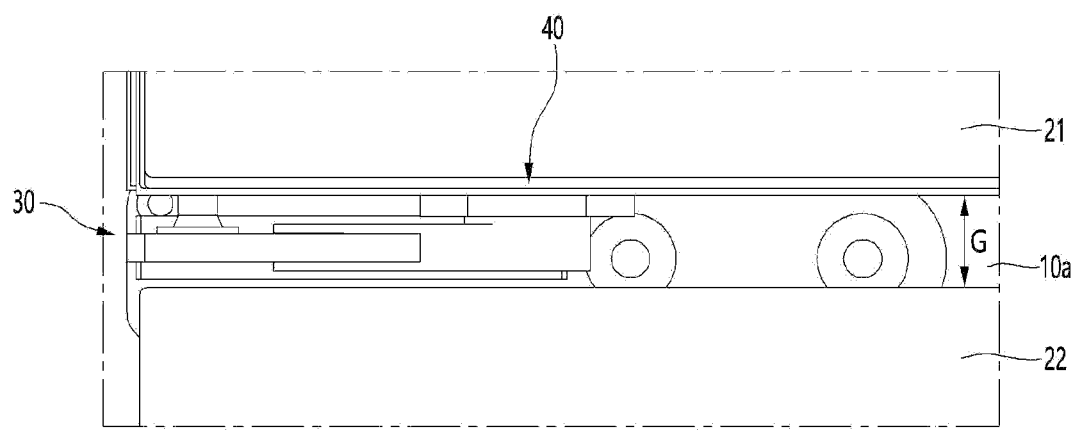
FIG. 2 is an enlarged view illustrating a portion A of FIG. 1.

FIG. 1 is a front view of a refrigerator according to an embodiment, and FIG. 2 is an enlarged view illustrating a portion A of FIG. 1.

Referring to FIGS. 1 and 2, a refrigerator 1 according to an embodiment may be installed independently in a kitchen or installed in an indoor furniture cabinet or wall. When the refrigerator 1 is installed in the indoor furniture cabinet or well, the refrigerator 1 may be installed alone or arranged side by side with another refrigerator.

The refrigerator 1 may include a cabinet 10 having a storage space and a refrigerator door 20 that opens and closes the storage space.

The storage space may not be limited, but may be divided into an upper first space and a lower second space, and the refrigerator door 20 may also include a first door 21 that opens and closes the first space and a second door 22 that opens and closes the second space.

The first space may be a refrigerating compartment, and the second space may be a freezing compartment or vice versa. Alternatively, the storage space may include a first space and a second space, which are divided into left and right sides. Alternatively, the storage space may be a single space, and a single refrigerator door may open and close the storage space.

At least one or more of the first door 21 and the second door 22 may be a rotation type door. Alternatively, the single refrigerator door 20 may be a rotation type door.

In this embodiment, the rotation type refrigerator door 20 may include an auto closing device 40 that provides closing force to the refrigerator door 20 in a state in which the refrigerator door 20 is opened and then closed again at a certain angle.

In FIG. 2, an example in which the auto closing device 40 is provided in the first door among the first door and the second door, which are arranged in a vertical direction will be described. It should be noted that the position of the auto closing device 40 is not limited.

When the first door 21 and the second door 22 are arranged in the vertical direction, a hinge bracket 30 is provided between the first door 21 and the second door 22.

The hinge bracket 30 may provide a rotational center of the first door 21. Alternatively, the hinge bracket may also be disposed at an upper side of the first door 21.

The hinge bracket 30 may be fixed to a front surface 10a of the cabinet 10. A gap G having a predetermined size is defined between the first door 21 and the second door 22. A portion of the hinge bracket 30 is disposed between the first door 21 and the second door 22 so that the first door 21 and the second door 22 rotate without interfering with each other, and also is spaced apart from a top surface of the second door 22 as well as a bottom surface of the first door 21.

The auto closing device 40 according to this embodiment may provide closing force to the first door 21 in a process of closing the first door 21 while acting with the hinge bracket 30. Alternatively, the auto closing device 40 may provide the closing force to the second door 22.

In order for the auto closing device 40 to provide the closing force to the first door 21, the auto closing device 40 may be installed in the first door 21.

For example, the auto closing device 40 may be installed at a lower side of the first door 21, and in order to interact with the hinge bracket 30, a portion of the auto closing device 40 may protrude downward from the bottom surface of the first door 21.

When the auto closing device 40 is installed at the lower side of the first door 21, the auto closing device 40 may not be easily seen from the outside while the first door 21 is opened and closed. A body to be described later may be inserted into the lower side of the first door 21, and a lever may protrude to the outside of the first door 21.

The auto closing device 40 may be spaced apart from a top surface of the second door 22 so that the auto closing device 40 does not interfere with the second door 22.

Figure 3:
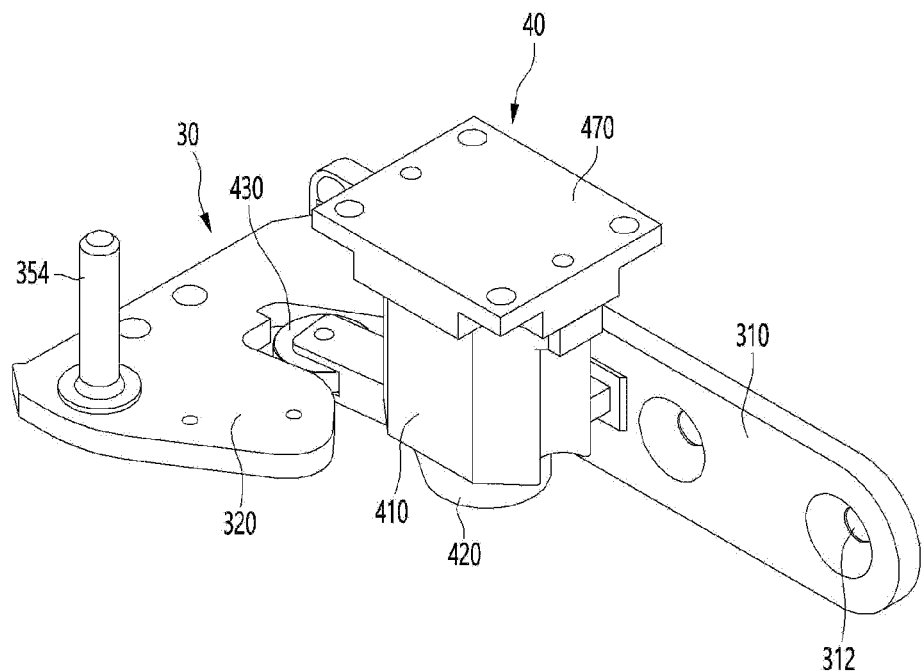
FIG. 3 is a perspective view illustrating a hinge bracket and an auto closing device according to an embodiment.

FIG. 3 is a perspective view illustrating the hinge bracket and the auto closing device according to an embodiment.

For example, FIG. 3 illustrates relative positions of the auto closing device 40 and the hinge bracket 30 in the state in which the first door 21 is closed.

Referring to FIGS. 2 and 3, the hinge bracket 30 may include a coupling portion 310 to be coupled to the cabinet 10, and a bracket body 320 extending horizontally from the coupling portion 310.

The coupling portion 310 may be coupled to a front surface 10a of the cabinet 10.

The coupling portion 310 may include one or more coupling holes 312. A coupling member may be coupled to the cabinet 10 through the coupling holes 312.

A height of the bracket body 320 may be less than that of the coupling portion 310. The bracket body 320 may extend in a horizontal direction from a position spaced apart from upper and lower ends of the coupling portion 310. For example, the bracket body 320 may extend from an intermediate portion of the coupling portion 310.

A shaft 354 may be provided in the bracket body 320. The shaft 320 may protrude upward from a top surface of the bracket body 320. The shaft 354 is coupled to the first door 21 to provide a rotational center of the first door 21.

The auto closing device 40 may be disposed at a position spaced apart from the shaft 354 in the horizontal direction. That is, the auto closing device 40 may be coupled to the first door 21 at a position spaced apart from the shaft 354.

The auto closing device 40 may rotate together with the first door 21, and in the process of closing the first door 21, the auto closing device 40 may interact with the bracket body 320 to provide the closing force to the first door 21.

Hereinafter, the auto closing device 40 will be described in detail.

Figure 4:
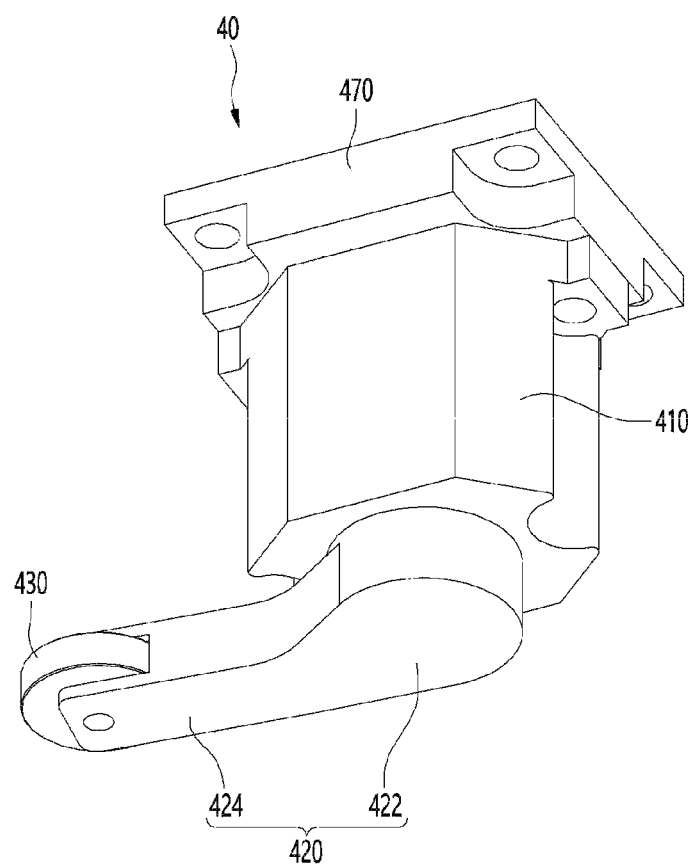
FIG. 4 is a perspective view of an auto closing device when viewed from the below according to an embodiment.
Figure 5:
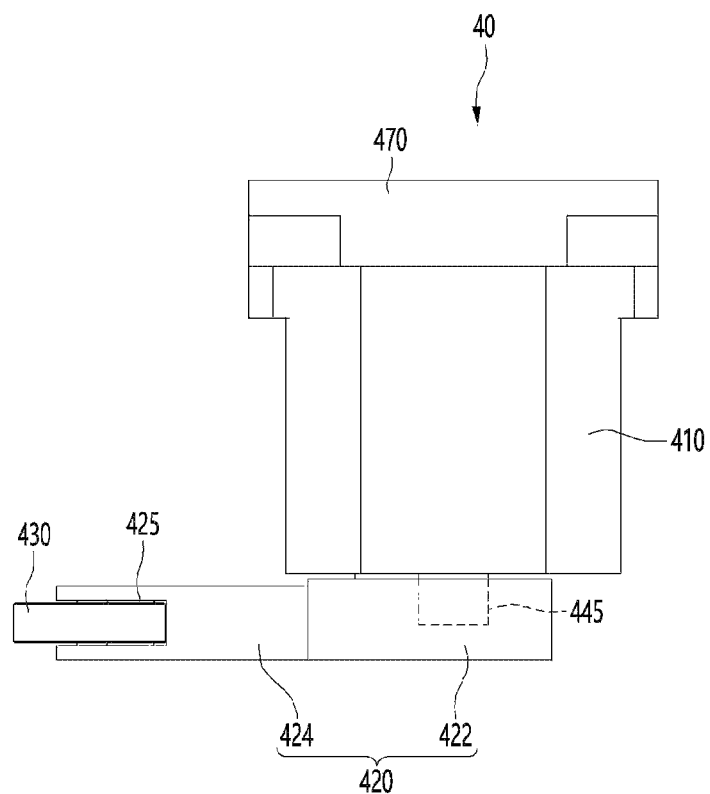
FIG. 5 is a side view of the auto closing device according to an embodiment.
Figure 6:
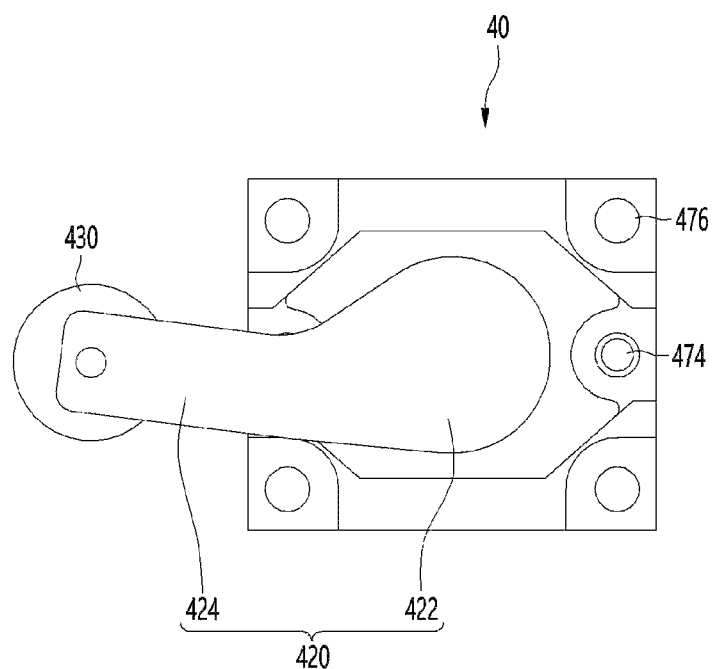
FIG. 6 is a bottom view of the auto closing device according to an embodiment.
Figure 7:
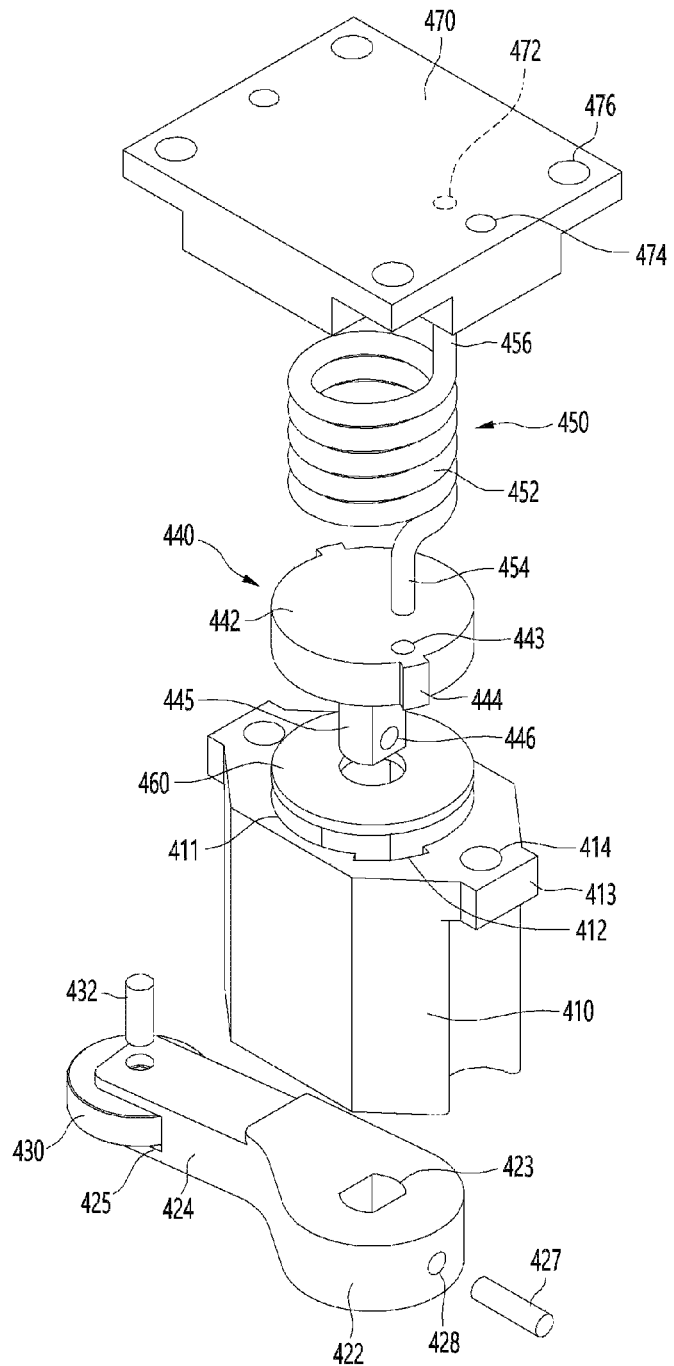
FIG. 7 is an exploded perspective view of the auto closing device according to an embodiment.

FIG. 4 is a perspective view of the auto closing device when viewed from the below according to an embodiment, FIG. 5 is a side view of the auto closing device according to an embodiment, FIG. 6 is a bottom view of the auto closing device according to an embodiment, and FIG. 7 is an exploded perspective view of the auto closing device according to an embodiment.

Referring to FIGS. 3 to 7, the auto closing device 40 according to this embodiment may include a body 410, an elastic member 450 accommodated in the body 410, and a lever 420 connected to the elastic member 450.

The body 410 may define an outer appearance of the auto closing device 40.

The lever 420 may be outside the body 410 and directly or indirectly connected to the elastic member 450 to rotate with respect to the body 410.

For example, the lever 420 may rotate in the horizontal direction based on a rotational center line extending in the vertical direction. That is, the rotational center line of the first door 21 and the rotational center line of the lever 420 may be parallel to each other and spaced apart from each other in the horizontal direction.

The body 410 may include an upper opening. The body 410 may further include an accommodation space 411. The elastic member 450 may be accommodated in the accommodation space 411 through the upper opening.

The body 410 may include one or more coupling extension portions 413. A coupling hole 414 may be defined in a coupling extension portion 413. Although not limited, the plurality of coupling extension portions 413 may be disposed to extend horizontally from the body 410.

The auto closing device 40 may further include a connector 440 accommodated in the body 410.

The connector 440 may be connected to the lever 420 to rotate together with the lever 420. Also, the connector 440 may be connected to the elastic member 450. That is, the connector 440 connects the elastic member 450 to the lever 420.

A rotational center of the connector 440 may be the same as the rotational center of the lever 420.

The connector 440 may be accommodated in the accommodation space 411 through the upper opening of the body 410.

The connector 440 may include a connector body 442 and a lever coupling portion 445 extending downward from the connector body 442.

The elastic member 450 may be coupled to the connector body 442. A lower portion of the elastic member 450 may be connected to the connector body 442.

A connection groove 443 may be defined in a top surface of the connector body 442. The connection groove 443 may be spaced apart from the rotational center of the connector 440 in a radial direction.

A diameter of the connector body 442 may be the same as or slightly less than that of the accommodation space 411. Thus, movement of the connector body 442 in the accommodation space 411 in the horizontal direction may be minimized.

The connector body 442 may be provided, for example, in a circular plate shape. A protrusion 444 may be provided on a side surface of the connector body 422. The protrusion 444 may protrude outward in the radial direction from a side surface of the connector body 442.

The body 410 may include an accommodation portion 412 in which the protrusion 444 is accommodated. The accommodation portion 412 may be provided from the top surface of the body 410 and is recessed downward. Therefore, when the connector 440 is accommodated in the accommodation space 411 from the upper side, the protrusion 444 may be accommodated in the accommodation portion 412 without interfering with the body 410. The accommodation portion 412 may extend radially outward from the accommodation space 411.

A horizontal length (or length in a circumferential direction) of the accommodation portion 412 may be greater than a horizontal length (or length in a circumferential direction) of the protrusion 444.

Thus, the connector 440 may rotate within a length range of the accommodation portion 412 in the state in which the protrusion 444 is accommodated in the accommodation portion 412.

The protrusion 444 and the accommodation portion 412 may restrict the horizontal movement of the connector 440 as well as the rotation range. That is, the connector 440 may rotate within a predetermined angle range due to a length difference between the protrusion 444 and the accommodation portion 412. Since the lever 420 is connected to the connector 440, the lever 420 may also be restricted to rotate within the predetermined angle range.

The lever coupling portion 445 may be smaller than the diameter of the connector body 442. The lever coupling portion 445 may extend downward from a bottom surface of the connector body 442.

Although not shown, the body 410 may include a lower wall, and the lever coupling portion 445 may pass through the lower wall. The lever coupling portion 445 passing through the lower wall may protrude downward from the body 410.

A portion of the lever coupling portion 445 protruding from the lower wall of the body 410 may be coupled to the lever 420.

A vertical length of the lever coupling portion 445 may be longer than that of the connector body 442.

The lever coupling portion 445 may be inserted into the lever 420. A horizontal cross-section of the lever coupling portion 445 may be provided in a non-circular shape so that the lever coupling portion 445 is prevented from rotating relative to the lever 420 while being coupled to the lever 420.

A pin insertion hole 446 may be provided in the lever coupling portion 445. The lever coupling portion 445 may be coupled to the lever 420 in the vertical direction, and the pin insertion hole 446 may extend in the horizontal direction.

The lever 420 may include a first portion 422 coupled to the connector 440. The first portion 422 may also be referred to as a connector coupling portion.

The first portion 422 may include a coupling slot 423 into which the lever coupling portion 445 is inserted. The coupling slot 423 may be defined by being recessed downward from a top surface of the first portion 422.

A horizontal cross-section of the coupling slot 423 may be defined in the same shape as that of the lever coupling portion 445.

For example, the lever coupling portion 445 may be coupled to the coupling slot 423 in a press-fitting manner.

With the lever coupling portion 445 inserted into the coupling slot 423, the lever coupling portion 445 and the first portion 422 may be coupled to each other by a coupling pin 427. The first portion 422 may include a through-hole 428 through which the coupling pin 427 passes. The through-hole 428 may extend in the horizontal direction from a side surface of the first portion 422 to communicate with the coupling slot 423.

When the coupling pin 427 passes through the through-hole 428 and is inserted into the pin insertion hole 446 of the lever coupling portion 445, the lever coupling portion 445 and the lever 420 may be prevented from being separated from each other.

In the state in which the lever 420 and the lever coupling portion 445 are coupled by the coupling pin 427, the top surface of the first portion 422 may be spaced apart from the bottom surface of the body 410.

The lever 420 may further include a second portion 424 extending in the horizontal direction from the first portion 422.

A vertical length of the second portion 424 may be less than that of the first portion 422. A top surface of the second portion 424 may be disposed lower than the top surface of the first portion 422.

The reason in which the vertical length of the first portion 422 is greater than the vertical length of the second portion 424 is to secure a depth into which the lever coupling portion 445 is inserted.

The second portion 424 may be in contact with the bracket body 320. Alternatively, the lever 420 may further include a roller 430 that is coupled to the second portion 424 and is in contact with the bracket body 320.

In this specification, a portion of the lever 420, which is in contact with the bracket body 320, may be referred to as a contact portion. In this case, the second portion 424 may be the contact portion, or the roller 430 may be the contact portion. FIG. 7 illustrates an example in which the roller 430 is provided on the second portion 424. The roller 430 may be rotatably coupled to the second portion 424. When the rotation roller 430 is in contact with the bracket body 320, frictional force may be reduced more than when the second portion 424 is in contact with the bracket body 320, and wear due to friction may be reduced.

The second portion 424 may include a roller accommodation portion 425 in which a portion of the roller 430 is accommodated.

A vertical length of the roller 430 may be less than a vertical length of the second portion 424. The roller accommodation portion 425 may be disposed between top and bottom surfaces of the second portion 424. That is, the roller accommodation portion 425 may be disposed at a position spaced apart from the top surface of the second portion 424 by a predetermined distance and at a position spaced apart from the bottom surface of the second portion 424 by a predetermined distance.

In the state in which the roller 430 is accommodated in the roller accommodation portion 425, a roller coupling pin 432 couples the roller 430 to the second portion 424.

Thus, the roller 430 may be supported by the lever 420 so as to be rotatable with the roller coupling pin 432 as the rotational center.

A diameter of the roller 430 may be greater than a recessed depth (a depth in the horizontal direction based on FIG. 5) of the roller accommodation portion 425. A diameter of the roller 430 may be greater than a width of the second portion 424.

Thus, in the state where the roller 430 is coupled to the lever 420 by the roller coupling pin 432, the roller 430 may protrude outward from the second portion 424.

The elastic member 450 may be, for example, a torsion spring. The elastic member 450 may include a body portion 452 provided by winding a wire multiple times. The body portion 452 may have a cylindrical or truncated cone shape.

The elastic member 450 may further include a first extension portion 454 extending from a lower end of the body portion 452. The first extension portion 454 may extend downward from the body portion 452.

The first extension portion 454 may be inserted into the connection groove 443 of the connector 440. For example, the first extension portion 454 may be inserted into the connection groove 443 in a press-fitting manner.

The elastic member 450 may further include a second extension portion 456 extending from an upper end of the body portion 452. The second extension portion 456 may extend upward from the body portion 452.

The auto closing device 40 may further include a cap 470 covering an upper opening of the body 410.

The cap 470 may include a connection groove 472 into which the second extension portion 456 is inserted. The connection groove 472 may be defined by being recessed upward from a bottom surface of the cap 470. For example, the first extension portion 456 may be inserted into the connection groove 443 in a press-fitting manner.

The cap 470 may further include a first coupling hole 474 aligned with a coupling hole 414 of the body 410. A coupling member (not shown) may be coupled to the coupling hole 414 of the body 410 and the first coupling hole 474. Thus, the cap 470 and the body 410 may be coupled to each other by the coupling member.

The cap 470 may further include one or more second coupling holes 476. A coupling member (not shown) may pass through the second coupling hole 476 and be coupled to the first door 21.

Since the cap 470 is coupled to the body 410, a position of the cap 470 is fixed. On the other hand, the connector 440 is rotatable within the body 410.

Since a second extension end 456 of the elastic member 450 is connected to the cap 470, and a first extension end 454 is connected to the connector 440, in this embodiment, the second extension end 456 may be referred to as a fixed end, and the first extension portion 454 may be referred to as a movable end.

Thus, in a state in which the second extension portion 456 is fixed, the first extension portion 454 is rotatable together with the lever 420.

When the first extension portion 454 of the elastic member 450 rotates in one direction while the second extension portion 456 is fixed, the elastic member 450 accumulates elastic force. The elastic force accumulated by the elastic member 450 may act on the lever 420 so that the lever 420 rotates in another direction opposite to the one direction.

In this manner, the elastic force accumulated by the elastic member 450 substantially acts on the first door 21 in the process of closing the first door 21 so that the first door 21 is automatically closed from a predetermined position.

The auto closing device may further include a bearing 460 that reduces friction between the connector body 442 and the lower wall of the body 410. The bearing 460 is seated on an upper side of the lower wall of the body 410, and the lever coupling portion 445 may pass through the bearing 460.

Figure 8:
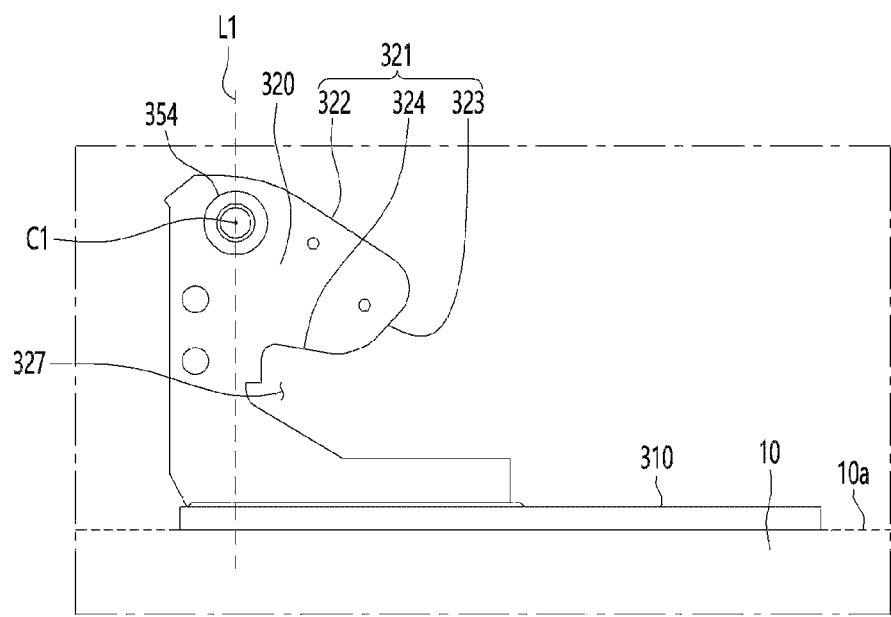
FIG. 8 is a view illustrating the hinge bracket fixed to a cabinet when viewed from the below.

FIG. 8 is a view illustrating the hinge bracket fixed to the cabinet when viewed from the below.

Referring to FIG. 8, the bracket body 320 of the hinge bracket 30 may include a contact surface 321 that is in contact with the lever 420.

For example, the roller 430 of the lever 420 may be in contact with the contact surface 321. While the lever 420 moves along the contact surface 321, the lever 420 may rotate.

The contact surface may include a first surface 322 on which the lever 420 is in initially contact with the contact surface 321 in the process of closing the first door 21. In a state where the first door 21 is opened at a predetermined angle or more, the lever 420 may not be in contact with the first surface 322, and in the process of closing the first door 21, the lever 420 may be in contact with the first surface 322.

The first surface 322 is not only disposed to be inclined with respect to the front surface 10a of the cabinet 10, but also disposed to be inclined with respect to a virtual line L1 that is perpendicular to the front surface 10a of the cabinet 10 by passing through a rotational center or a rotational center line C1 of the first door 21. The rotational center line C1 is a line passing through the rotational center of the first door 21.

The first surface 322 may be inclined in a direction away from the virtual line L1 as the first surface 322 approaches the front surface 10a of the cabinet 10.

The contact surface 321 may further include a second surface 323 extending from the first surface 322. The second surface 323 may be inclined with respect to the first surface 322. A length of the second surface 323 may be less than that of the first surface 322.

The second surface 323 may be inclined not only with respect to the front surface 10a of the cabinet 10, but also with respect to the virtual line L1.

The second surface 323 may be inclined in a direction closer to the virtual line L1 as the second surface 323 approaches the front surface 10a of the cabinet 10.

The contact surface 321 may further include a third surface 324 extending from the second surface 323. The third surface 324 may be inclined with respect to the second surface 323.

The third surface 324 may be inclined not only with respect to the front surface 10a of the cabinet 10, but also with respect to the virtual line L1.

The third surface 324 extends in a direction closer to the virtual line L1 as a distance from the front surface 10a of the cabinet 10 increases.

The bracket body 320 may further include an accommodation groove 327 that accommodates the roller 430 of the lever 420. As the roller 430 is being accommodated in the accommodation groove 327, the roller 430 that is in contact with the second surface 323 is now in contact with the third surface 324. That is, in the state in which the first door is closed, the roller 430 may be disposed in the accommodation groove 327 and may be in contact with the third surface 324.

Figure 9:
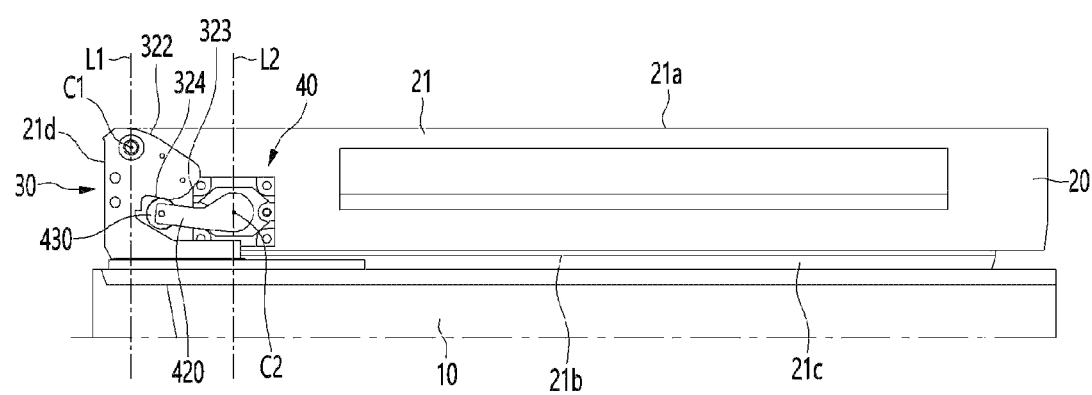
FIG. 9 is a view illustrating a position of a lever of the auto closing device in a state in which a first door is closed.

FIG. 9 is a view illustrating a position of the lever of the auto closing device in the state in which a first door is closed. FIG. 9 illustrates a view of the auto closing device viewed from a lower side of the first door.

Referring to FIG. 9, when the refrigerator according to this embodiment is installed in a furniture cabinet, it is preferable that a thickness of the first door 21 is reduced to reduce the forward protrusion of the first door 21 from the front surface of the furniture cabinet.

When the thickness of the first door 21 is reduced, in order for the auto closing device 40 to be installed in the first door 21, the auto closing device 40 may be installed at a position spaced apart from the rotational center line C1 of the first door 21.

For example, when the first door 21 is closed, the rotational center line C1 of the first door 21 and the rotational center or rotational center line C2 of the lever 420 are spaced apart from each other. The rotational center line C2 of the lever 420 is a line passing through the rotational center of the lever 420.

In addition, when the refrigerator is installed in the furniture cabinet, an opening angle needs to be secured so that the first door 21 does not collide with the furniture cabinet during the rotation of the first door 21.

Therefore, in this embodiment, the rotational center line C1 of the first door 21 may be disposed close to the front and side surfaces of the first door 21.

For example, in the state in which the first door 21 is closed, the rotational center line C1 of the first door 21 may be disposed closer to a front surface 21a than a rear surface 21b of the first door 21.

A distance between the rotational center line C1 of the first door 21 and the rear surface 21b of the first door 21 may be more than twice a distance between the rotational center line C1 of the first door 21 and the front surfaces 21a of the first door 21.

In the state in which the first door 21 is closed, the rotational center line C1 of the first door 21 may be disposed closer to a first side surface 21d of the two side surfaces of the first door 21.

In the state in which the first door 21 is closed, a distance between the rotational center line C1 of the first door 21 and the first side surface 21d may be less than that between the rotational center line C1 of the first door 21 and the rear surface 21b of the first door 21.

In the state in which the first door 21 is closed, a distance between the rotational center line C1 of the first door 21 and the front surface 21a of the first door 21 may be less than between the front surface 21a of the first door 21 and the rotational center line C2 of the lever 420.

In the state in which the first door 21 is closed, a distance between the rotational center line C1 of the first door 21 and the front surface 10a of the cabinet 10 may be greater than that between the rotational center line C2 of the lever 420 and the front surface 10a of the cabinet 10.

In the state in which the first door 21 is closed, the roller 430 of the lever 420 may be disposed on an area between the virtual line L1 (first virtual line) and the virtual line L2 (second virtual line) perpendicular to the front surface 10a of the cabinet 10 while passing through the rotational center line C2 of the lever 420.

A gasket 21c that is in contact with the cabinet 10 in the state in which the first door 21 is closed may be provided on the rear surface 21b of the first door 21. In order for the gasket 21c to be coupled to the first door 21, a groove in which a portion of the gasket 21c is accommodated may be defined in the rear surface of the first door 21.

In the state in which the first door 21 is closed, the roller 430 of the lever 420 may be disposed closer to the rear surface 21b of the first door 21 than the rotational center line C1 of the first door 21.

In the state in which the first door 21 is closed, a portion of the first surface 322 may be disposed closer to the front surface 21a of the first door 21 than to the rotational center line C1 of the first door 21. In the state in which the first door 21 is closed, the other portion of the first surface 322 may be disposed closer to the rear surface 21b of the first door 21 than the rotational center line C1 of the first door 21.

In the state in which the first door 21 is closed, the second surface 323 and the third surface 324 may be disposed closer to the rotational center line C1 of the first door 21 than the rear surface 21b of the first door 21.

In the state in which the first door 21 is closed, the second surface 323 and the third surface 324 may be disposed closer to the rotational center line C2 of the lever 420 than the front surface 21a of the first door 21.

The roller 430 of the lever 420 is maintained in the state of being in contact with the third surface 324 while being accommodated in the accommodation groove 327.

Since the roller 430 is in contact with the third surface 324, the closed state of the first door 21 may be stably maintained when the first door 21 is closed.

Figure 10:
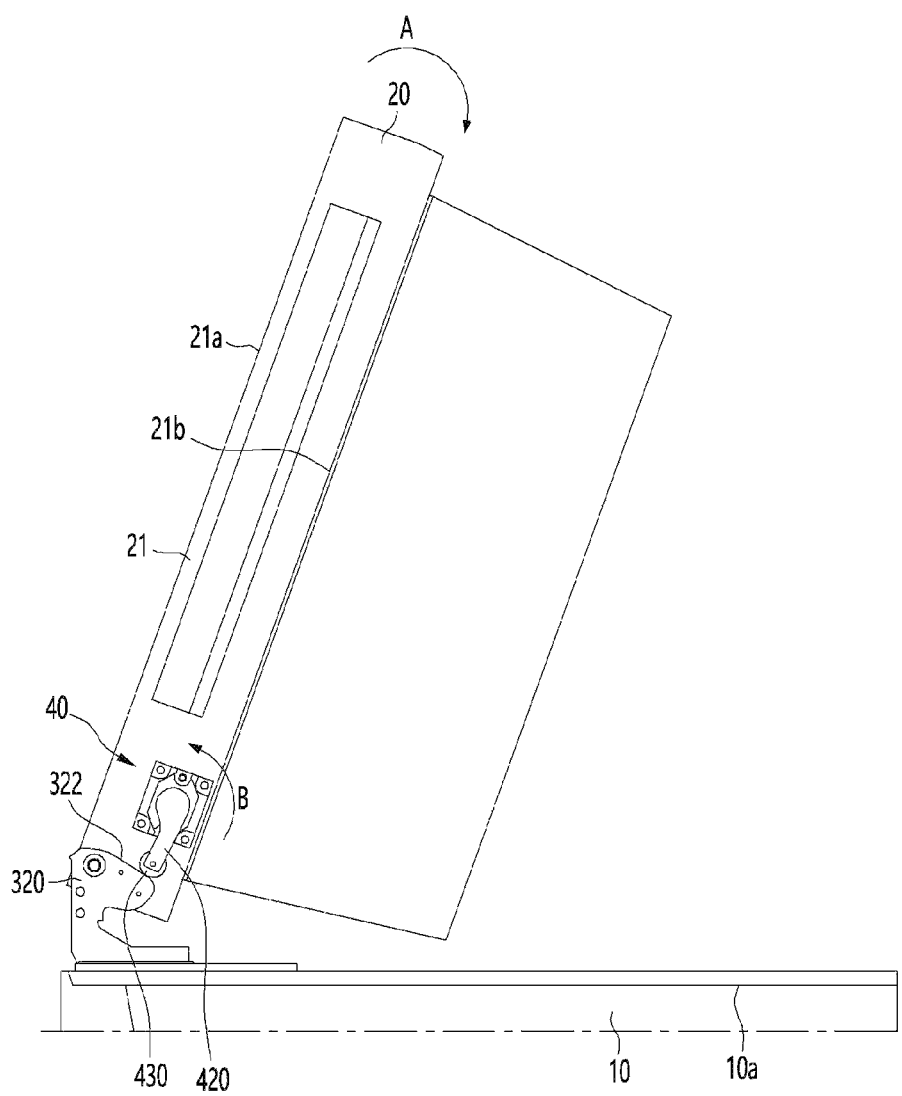
FIG. 10 is a view illustrating a state in which the lever moves along a first surface of a bracket body in the process of closing the first door.
Figure 11:
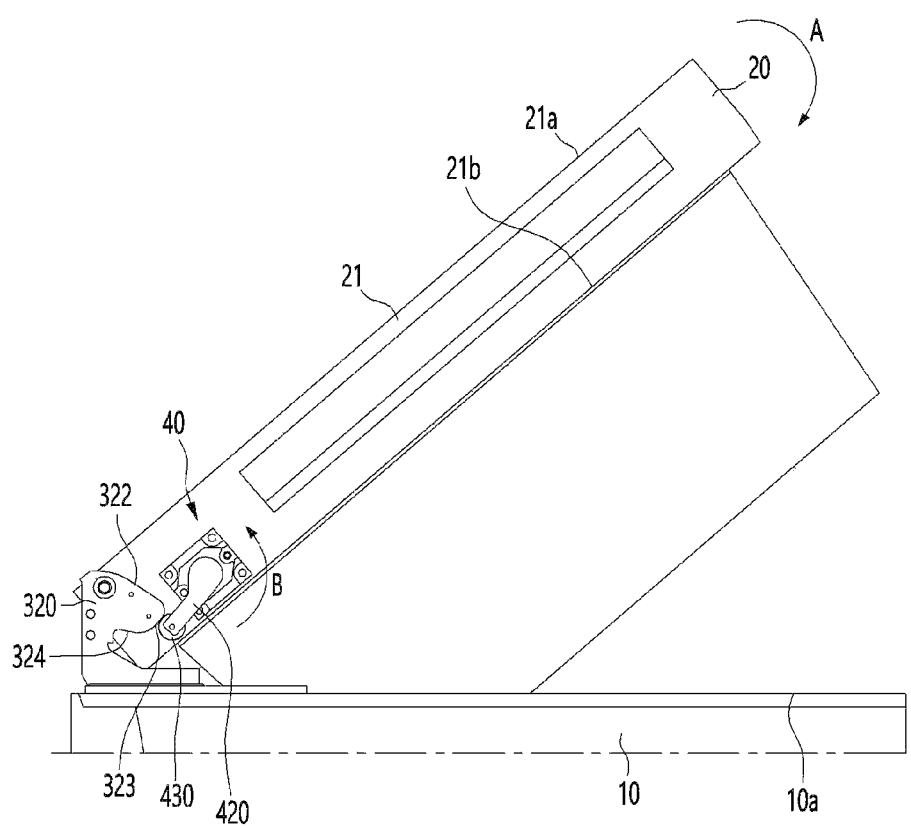
FIG. 11 is a view illustrating a state in which the lever moves along a second surface in the process of closing the first door.
Figure 12:
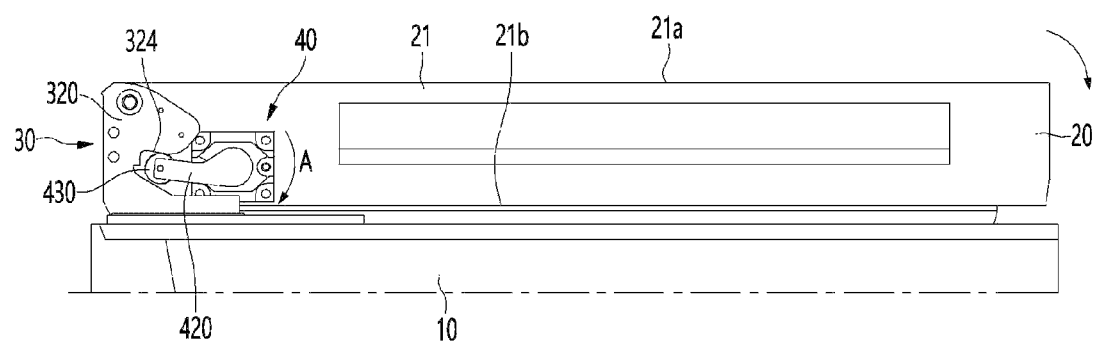
FIG. 12 is a view illustrating a position of the lever in the state in which the first door is closed.

FIG. 10 is a view illustrating a state in which the lever moves along the first surface of the bracket body in the process of closing the first door, FIG. 11 is a view illustrating a state in which the lever moves along the second surface in the process of closing the first door, and FIG. 12 is a view illustrating a position of the lever in the state in which the first door is closed.

Referring to FIGS. 10 to 12, when the lever 420 is spaced apart from the bracket body 320 in the process of closing the first door 21 after the first door 21 is opened, external force may not act on the lever 420.

In the process of closing the first door 21 in a direction A, when the first door 21 is angled at a reference angle with respect to the front surface 10a of the cabinet 10, the lever 420 may be in contact with the first surface 322 of the bracket body 320.

When the first door 21 further rotates in the A direction while the lever 420 is in contact with the first surface 322 of the bracket body 320, the lever 420 may rotate in a direction B opposite to the direction A by an inclination of the first surface 322.

The first surface 322 applies resistive force to the lever 420 so that the lever 420 rotates in the direction B.

When the lever 420 is rotated in the direction B, the first extension portion 454 of the elastic member 450 also rotates in the direction B so that the elastic member 450 accumulates elastic force.

When the lever 420 approaches the second surface 323 while the first door 21 is closing, the elastic force accumulated in the elastic member 450 increases.

When the lever 420 is in contact with the second surface 323 while the first door 21 is closing, the lever 420 additionally rotates in the direction B. When the lever 420 additionally rotates in the direction B, the elastic force accumulated in the elastic member 450 increases.

According to this embodiment, the elastic force accumulated in the elastic member 450 is maximized in the state in which the lever 420 is in contact with the second surface 323. The elastic force accumulated in the elastic member 450 in the state in which the lever 420 is in contact with the second surface 323 is greater than that accumulated in the elastic member 450 in the state in which the lever 420 is in contact with the first surface 322.

The lever 420 may rotate in the direction A in the state in which the lever 420 is in contact with the second surface 323 according to an angle of the second surface 323. When the lever 420 rotates in the A direction, the elastic force accumulated in the elastic member 450 decreases. In this case, the elastic force accumulated in the elastic member 450 is maximized in the state in which the lever 420 is in contact with the first surface 322. Since the lever 420 inertially rotates in the direction A, and the rotation angle of the lever 420 in the direction A is less than the rotation angle of the lever 420 in the direction B, a torque loss of the lever 420 may be reduced, or a degree of reduction of the elastic force accumulated in the elastic member 450 may be minimized.

Alternatively, according to the angle of the second surface 323, the lever 420 may rotate in the direction B in the state in which the lever 420 is in contact with a portion of the second surface 323, and also, the lever 420 may rotate in the direction A in the state in which the lever 420 is in contact with the other portion of the second surface 323. Even in this case, the elastic force accumulated in the elastic member 450 is maximized in the state in which the lever 420 is in contact with the second surface 323.

When the lever 420 deviates from the second surface 323 in the process of closing the first door 21, the resistive force applied to the lever 420 is removed, and the elastic force accumulated in the elastic member 450 may act on the lever 420 to increase in rotation angle in the direction A of the lever 420, and thus, the first door 21 may be automatically closed.

That is, while the lever 420 moves along the third surface 324, the elastic force accumulated in the elastic member 450 decreases. That is, the elastic force decreases as it acts as the closing force of the first door 21.

Here, since the lever 420 rotates while the roller 430 of the lever 420 is being accommodated in the accommodation groove 327, the elastic force of the elastic member 450 acts in a direction crossing the third surface 324 or in a normal direction in the state in which the roller 430 is in contact with the third surface 324. Therefore, the elastic force may be prevented from being concentrated at a specific point of the third surface 324, and efficiency of transmitting the elastic force to the third surface 324 is high.

As described above, when the elastic force of the elastic member 450 acts in a direction crossing the third surface 324, rattling of the first door 21 or a phenomenon in which the first door 21 is closed and then opened again due to the excessive action of the elastic force at a time point at which the first door 21 is closed may be prevented from occurring.

In this embodiment, torque of the lever 420 may be maximized when the opening angle (an angle angled between the door and the front surface of the cabinet when the door is closed) of the first door 21 is approximately 10 degrees or less. When the first door 21 is disposed in the left and right direction, a pillar may be provided on either the left door or the right door. The pillar serves to block leakage of cold air from the storage space between the left and right doors.

For example, the pillar is rotatably disposed on the left door, and the pillar is automatically unfolded while the left door is closed. An angle at which the pillar is unfolded may be a case in which the opening angle of the left door is approximately 10 degrees or less and be designed so that the torque is maximized when the opening angle of the left door is approximately 10 degrees or less so that the pillar is easily unfolded.

In this embodiment, as illustrated in FIG. 12, the roller 430 of the lever 420 is in contact with the third surface 324 when the door is closed.

The third surface 324 may provide the resistive force to the lever 420, and thus, the lever 420 exists in a substantially rotating state at a predetermined angle in the state in which the first door 21 is closed so that the elastic member 450 is maintained in the state of accumulating a certain amount of elastic force. Therefore, since the elastic member 450 applies force in the direction in which the first door 21 is closed in the state in which the first door 21 is closed, the closed state of the first door 21 may be stably maintained.

In the state in which the first door 21 is closed, and the lever 420 is in contact with the third surface 324, the elastic force accumulated in the elastic member 450 may be equal to or greater than the elastic force accumulated in the elastic member 450 in a state in which the first door 21 is opened at a predetermined angle, and the lever 420 is spaced apart from the first surface 322.

In summary, when the first door 21 is closed, while the lever 420 moves along a partial section of the contact surface 321, the elastic force is accumulated in the elastic member 450 and is maximized, and the elastic force of the elastic member 450 acts on the lever 420 in a different section of the contact surface so that the first door 21 is automatically closed.

While the lever 420 moves along a portion of the contact surface 321 based on the front surface 10a of the cabinet 10, the roller 430 gets closer to the front surface 10a of the cabinet 10, and while the lever 420 moves along the other portion of the contact surface 321, the contact surface 321 of the bracket body 320 is defined so that the roller 430 is away from the front surface 10a of the cabinet 10.

Alternatively, while the lever 420 moves along a portion of the contact surface 321 based on the rear surface 21b of the first door 21, the roller 430 gets closer to the rear surface 21b, and while the lever 321 moves along the other portion of the contact surface 321, the contact surface 321 of the bracket body 320 is defined so that the roller 430 is away from the rear surface 21b.

For example, while the contact portion of the lever 420 moves along the first surface 322 and the second surface 323, the contact portion may get closer to the rear surface 21b of the first door 21. While the contact portion of the lever 420 moves along the third surface 324, the contact portion may be away from the rear surface 21b of the first door 21.

As another example, while the contact portion of the lever 420 moves along the first surface 322, the contact portion may get closer to the rear surface 21b of the first door 21. While the contact portion of the lever 420 moves along a portion of the second surface 323, the contact portion may get closer to the rear surface 21b of the first door 21, and while the contact portion of the lever 420 moves along a remaining portion of the second surface 323, the contact portion may be away from the rear surface 21b of the first door 21. While the contact portion of the lever 420 moves along the third surface 324, the contact portion may be away from the rear surface 21b of the first door 21.

A case in which the first door 21 is opened will be briefly described.

When the first door 21 is initially opened in the closed state, the lever 420 moves along the third surface 324. While the lever 420 moves along the third surface 324, the elastic force accumulated in the elastic member 450 increases.

When the opening angle of the first door 21 increases, the lever 420 moves from the third surface 324 to the second surface 323 and then moves along the second surface 323.

While the lever 420 moves along the second surface 323, the elastic force accumulated in the elastic member 450 may decrease slightly. Alternatively, while the lever 420 moves along the second surface 323, the elastic force accumulated in the elastic member 450 may increase.

When the opening angle of the first door 21 further increases, the lever 420 moves from the second surface 323 to the first surface 322 and then moves along the first surface 322. While the lever 420 moves along the first surface 322, the elastic force accumulated in the elastic member 450 decreases. When the lever 420 is spaced apart from the first surface 322, the elastic force accumulated in the elastic member 450 is minimized.

Figure 13:
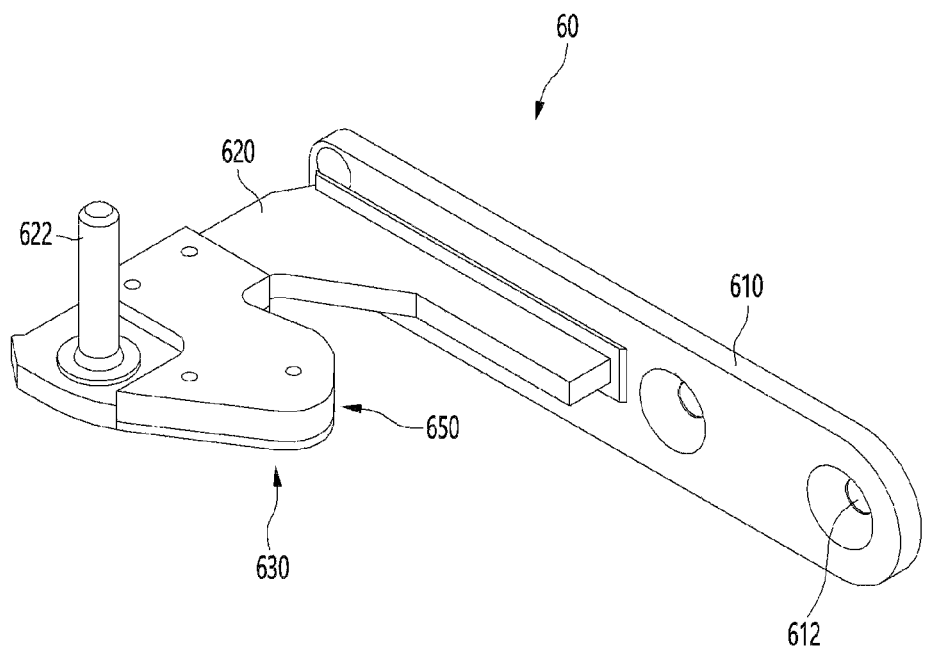
FIG. 13 is a perspective view of a hinge bracket according to another embodiment.
Figure 14:
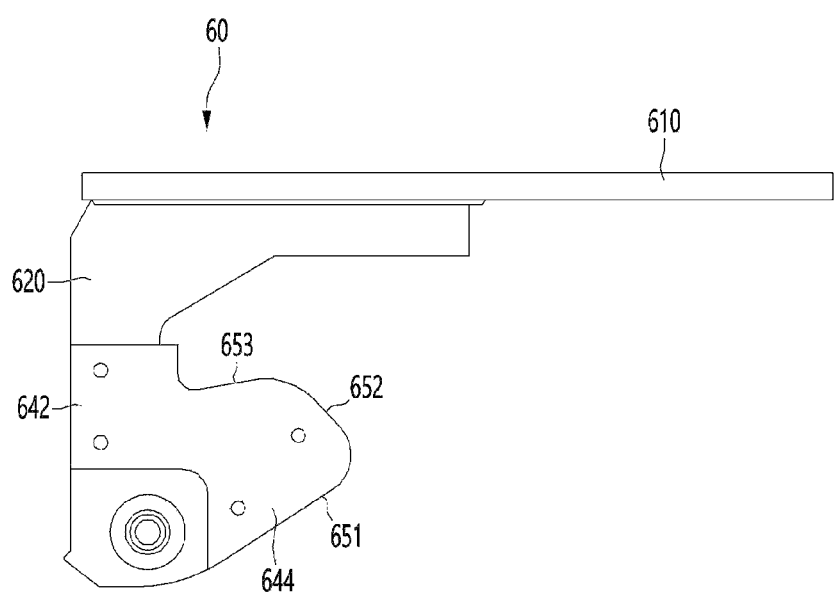
FIG. 14 is a plan view illustrating the hinge bracket of FIG. 13.
Figure 15:
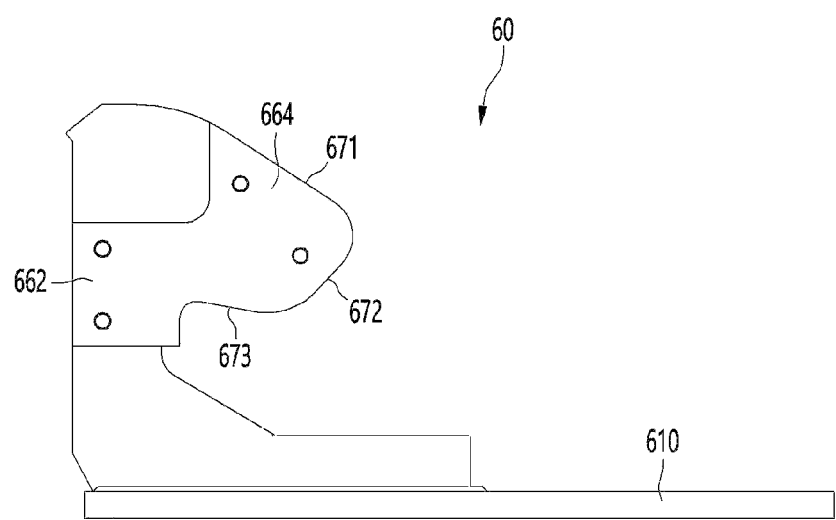
FIG. 15 is a bottom view illustrating the hinge bracket of FIG. 13.

FIG. 13 is a perspective view of a hinge bracket according to another embodiment, FIG. 14 is a plan view illustrating the hinge bracket of FIG. 13, and FIG. 15 is a bottom view illustrating the hinge bracket of FIG. 13.

Figure 16:
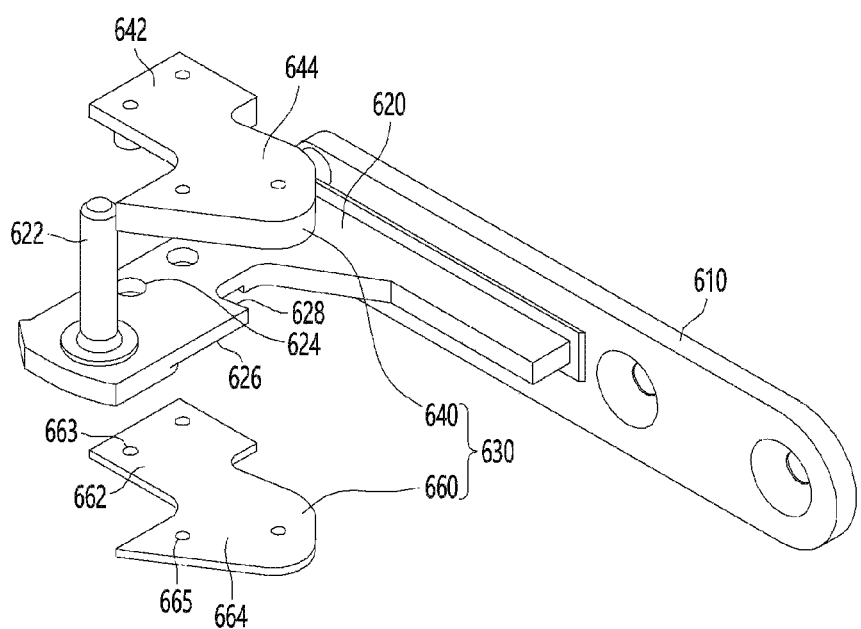
FIG. 16 is an exploded perspective view illustrating the hinge bracket of FIG. 13.
Figure 17:
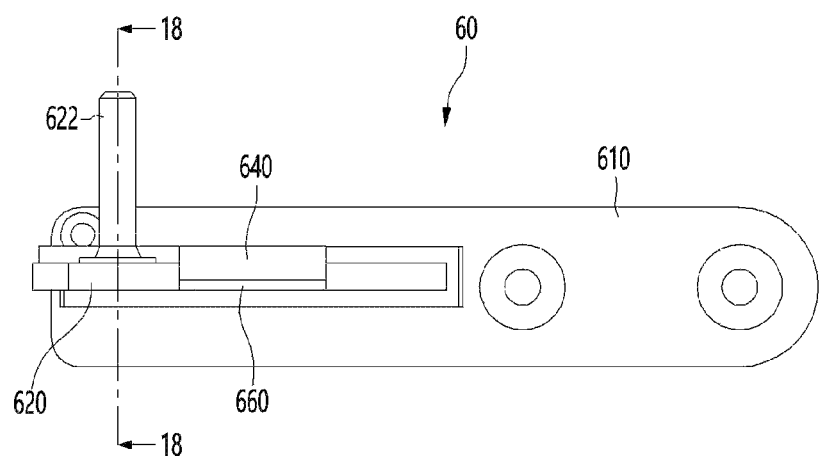
FIG. 17 is a front view illustrating the hinge bracket of FIG. 13.
Figure 18:
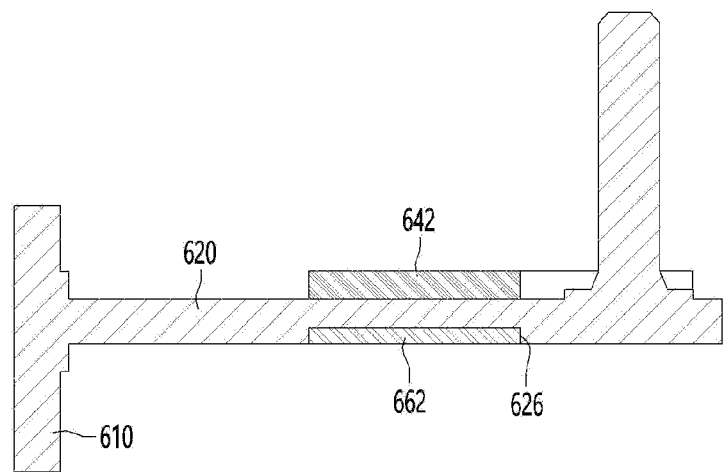
FIG. 18 is a cross-sectional view taken along line 18-18 of FIG. 17.
Figure 19:
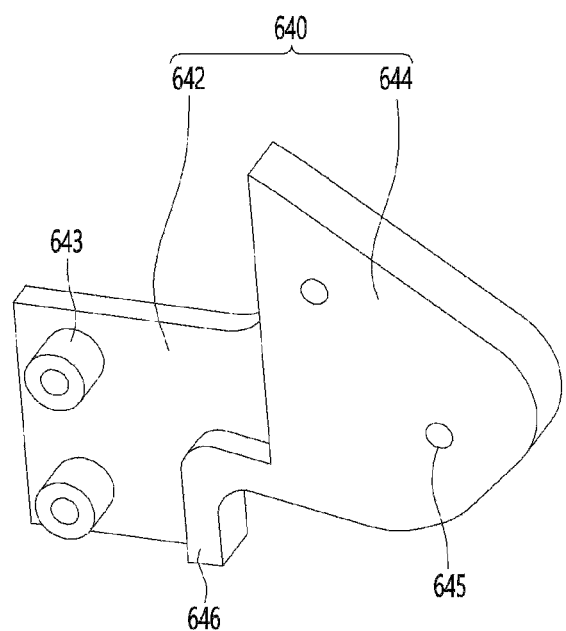
FIG. 19 is a perspective view illustrating a first cam body of a cam member when viewed from the below.

FIG. 16 is an exploded perspective view illustrating the hinge bracket of FIG. 13, FIG. 17 is a front view illustrating the hinge bracket of FIG. 13, and FIG. 18 is a cross-sectional view taken along line 18-18 of FIG. 17. FIG. 19 is a perspective view illustrating a first cam body of a cam member when viewed from the below.

This embodiment is the same or similar as the forgoing embodiment except for the hinge bracket. Therefore, since the description of the remaining portion other than the hinge bracket in FIGS. 1 to 12 may be equally applicable to this embodiment, only the hinge bracket will be described in detail below.

Referring to FIGS. 13 to 19, a hinge bracket 60 according to this embodiment is characterized in that a cam member 630 including a contact surface that is in contact with a lever 420 is replaceable.

For example, the hinge bracket 60 may include a coupling part 610 to be coupled to the cabinet 10, and a bracket body 620 extending horizontally from the coupling part 610.

The coupling part 610 may include one or more coupling holes 612. A coupling member may be coupled to the cabinet 10 through the coupling holes 612.

A height of the bracket body 620 may be less than that of the coupling portion 610. The bracket body 620 may extend in a horizontal direction from a position spaced apart from upper and lower ends of the coupling part 610.

The hinge bracket 60 may further include a cam member 630 separably coupled to the bracket body 620.

The cam member 630 includes a contact surface 650 to be in contact with the lever 420. When the contact surface 650 is worn, the cam member 630 may be separated from the bracket body 620, and then a new cam member 630 may be coupled to the bracket body 620.

As in this embodiment, since the cam member 630 is separably coupled to the bracket body 620, when only the cam member 630 is replaced without replacing the entire hinge bracket 60, service costs may be reduced.

In addition, since the cam member 630 is separably coupled to the bracket body 620, the cam member 630 may be separable in a state in which the first door 21 and the second door 22 are opened, and thus, service may be facilitated. That is, since it is not necessary to separate the doors, there is an advantage in that the replacement of the cam member 630 is easy.

The bracket body 620 may include a shaft 622 to which the first door 21 is coupled.

The bracket body 620 may further include one or more through-holes 624 configured to allow coupling of the cam member 630.

The through-hole 624 may be spaced apart from the shaft 622. In order that the cam member 630 is coupled to the bracket body 620 at a position at which the cam member 630 does not interfere with the shaft 622, the through-hole 624 may be defined between the shaft 622 and the coupling part 610.

A plurality of through-holes 624 may be provided in the bracket body 620 to firmly couple the bracket body 620 to the cam member 630.

The plurality of through-holes 624 may be arranged in a direction parallel to a direction in which the shaft 622 is spaced apart from the coupling part 610.

The cam member 630 may include a first cam body 640 and a second cam body 660 coupled to the first cam body 640.

The first cam body 640 and the second cam body 660 may be coupled to each other by a coupling member using the bracket body 620 as a medium.

For example, in the state in which the first cam body 640 is disposed above the bracket body 620, and the second cam body 660 is disposed below the bracket body 620, the first cam body 640 and the second cam body 660 may be coupled to each other.

When the first cam body 640 and the second cam body 660 are arranged in the vertical direction, the two cam bodies may be coupled to the bracket body 620. The coupling member may couple the first cam body 640, the bracket body 620, and the second cam body 660 to each other in a direction parallel to the extending direction of the shaft 622.

The first cam body 640 includes a first coupling part 642 seated on the bracket body 620 and a first extension part 644 extending in a horizontal direction from the first coupling part 642. The first coupling part 642 may be in contact with the bracket body 620 at one side of the bracket body 620.

The first coupling part 642 may include a coupling boss 643 inserted into the through-hole 624. The coupling boss 643 may protrude downward from a bottom surface of the first coupling part 642.

The coupling bosses 643 may be provided in the first coupling part 642 in the same number as the plurality of through-holes 624. When the plurality of coupling bosses 643 are inserted into the plurality of through-holes 624, the rotation of the first cam body 640 when the lever 420 is in contact with the cam member 630 may be prevented from occurring.

A thickness (length in the vertical direction) of the first extension part 644 may be greater than a thickness (length in the vertical direction) of the first coupling part 642.

For example, a top surface of the first extension part 644 may be disposed at the same height as the top surface of the first coupling part 642. A bottom surface of the first extension part 644 may be disposed lower than a bottom surface of the first coupling part 642.

Therefore, when the coupling boss 643 is inserted into the through-hole 624, the first coupling part 642 may be seated on a top surface of the bracket body 620, and the first extension part 644 may be in contact with a side surface of the bracket body 620.

In a state in which the first coupling part 642 is seated on the top surface of the bracket body 620, the bottom surface of the first extension part 644 may be disposed higher than the bottom surface of the bracket body 620.

One or more first coupling holes 645 may be provided in the first extension part 644. A plurality of first coupling holes 645 may be provided in the first extension part 644 to firmly couple the first cam body 640 to the second cam body 660. An arrangement direction of the plurality of first coupling holes 645 may intersect with an arrangement direction of the plurality of coupling bosses 643.

The first extension part 644 may define at least a portion of the contact surface 650. The first extension part 644 may include a first surface 651, a second surface 652, and a third surface 653. Since the shape and arrangement of the contact surface 650 are the same or similar as those described in the previous embodiment, a detailed description thereof will be omitted.

A recess portion 628 that is recessed in the horizontal direction may be provided in the bracket body 620, and the first cam body 640 may include a protrusion portion 646 disposed in the recess portion 628. The protrusion portion 646 may protrude from the first coupling part 642. The protrusion portion 646 may be disposed at a boundary between the first coupling part 642 and the first extension part 644. The protrusion portion 646 is provided to be curved in the horizontal direction, and as the protrusion portion 646 is in contact with the recess portion 628 while being disposed in the recess portion 628, the rotation of the first cam body 640 may be restricted.

The second cam body 660 may include a second coupling part 662 and a second extension part 664 extending in the horizontal direction from the second coupling part 662. The second coupling part 662 may be in contact with the bracket body 620 at the other side of the bracket body 620.

The second coupling part 662 may include a hole 663 aligned with the coupling boss 643 inserted into the through-hole 624. The same number of holes 663 as the number of through-holes 624 may be defined.

In a state in which the hole 663 and the coupling boss 643 are aligned with each other, the coupling member may pass through the hole 663 and be coupled to the coupling boss 643.

The first coupling part 642 and the second coupling part 662 may be coupled to a portion between the coupling part 610 and the shaft 622 in the bracket body 620.

An accommodation portion 626 that accommodates the second coupling part 662 may be provided in the bottom surface of the bracket body 620. The accommodation portion 626 may be provided as the bottom surface of the connector body 620 that is recessed upward. In the state in which the second coupling part 662 is accommodated in the accommodation portion 626, the bottom surface of the second coupling part 662 may be disposed at the same height (flush) as the bottom surface of the bracket body 620.

When the second coupling part 662 is accommodated in the accommodation portion 626, the second extension part 664 may be in contact with the first extension part 644. The second extension part 664 may include a second coupling hole 665 aligned with the first coupling hole 645.

A plurality of second coupling holes 665 may be provided in the second extension part 664. An arrangement direction of the plurality of second coupling holes 665 may intersect with an arrangement direction of the plurality of coupling bosses 643.

When the first coupling hole 645 and the second coupling hole 665 are aligned with each other, the coupling member may be coupled to the first coupling hole 645 and the second coupling hole 665.

The bottom surface of the second extension part 644 may be disposed at the same height as the bottom surface of the bracket body 620.

That is, according to this embodiment, in the state in which the first cam body 640 and the second cam body 660 are coupled to each other, the second cam body 660 may not protrude downward from the bracket body 620 to prevent the second cam body 660 from interfering with the second door 22.

The second extension part 664 may have first to third surfaces 671 and 672 disposed at positions corresponding to the first to third surfaces 651, 652, and 653 of the first extension part 644.

The first to third surfaces 671, 672, and 673 of the second extension part 664 may be vertically aligned with the first to third surfaces 651, 652, and 653 of the first extension part 644.

In this embodiment, the first to third surfaces 671, 672, and 673 of the second extension part 664 may define the other portion of the contact surface 650. In this case, the contact portion (for example, a roller) of the lever 420 may be in contact with the first to third surfaces 651, 652, and 653 of the first extension part 644, be in contact with the first to third surfaces 671, 672, and 673 of the second extension part 664, or be in contact with the first to third surfaces 651, 652, and 653 of the first extension part 644 and the first to third surfaces 671, 672, and 673 of the second extension part 664 at the same time.

Alternatively, only the first to third surfaces 651, 652, and 653 of the first extension part 644 may define the contact surface.

As another example, the second cam body 660 may be omitted from the cam member 630. In this case, it is also possible that the first cam body 640 is coupled to the bracket body 320 by the coupling member, and the first cam body 640 may provide the contact surface 650.

In the above embodiment, it has been described that the first cam body 640 and the second cam body 660 are coupled to the bracket body 620 in the vertical direction (the direction parallel to the extension direction of the shaft), but alternatively, the cam member 630 may be slidably coupled to the bracket body 620 in the horizontal direction (the direction crossing the extension direction of the shaft) in a state in which the cam member 630 is assembled.

In this case, after the cam member 630 is primarily coupled to the bracket body 620 in the horizontal direction, the coupling member may secondarily couple the cam member 630 to the bracket body 620 in the vertical direction. For example, the cam member 630 may include a slot, and in a state in which a portion of the bracket body 620 is accommodated in the slot, the coupling member may couple the cam member 630 to the bracket body 620 in the vertical direction.

The invention claimed is:

1. A refrigerator comprising:
a cabinet having a storage space;
a hinge bracket coupled to the cabinet;
a door to open and close the storage space, and rotatably coupled to a shaft provided at the hinge bracket; and
an auto closing device installed at the door at a position spaced apart from a rotational center line of the door and to interact with the hinge bracket,
wherein the auto closing device comprises a lever and an elastic member to elastically support the lever, and
the hinge bracket comprises:
a bracket body provided with the shaft; and
a cam member separably coupled to the bracket body and provided with a contact surface to contact with the lever.

2. The refrigerator of claim 1, wherein the contact surface includes a contour so that:
while a contact portion of the lever moves along a portion of the contact surface, the contact portion moves closer to a front surface of the cabinet, and while the contact portion of the lever moves along another portion of the contact surface, the contact portion moves away from the front surface of the cabinet.

3. The refrigerator of claim 1, wherein the cam member comprises a first cam body and a second cam body coupled to the first cam body, and
in a state in which a portion of the bracket body is disposed between the first cam body and the second cam body, the first cam body, the bracket body, and the second cam body are coupled to each other.

4. The refrigerator of claim 3, further comprising a coupling member coupled to the first cam body, the bracket body, and the second cam body.

5. The refrigerator of claim 4, wherein the coupling member is coupled to the first cam body, the bracket body, and the second cam body in a direction parallel to an extension direction of the shaft.

6. The refrigerator of claim 3, wherein the first cam body comprises a first coupling part that is in contact with the bracket body at one side of the bracket body and a first extension part extending from the first coupling part in a horizontal direction, and
the second cam body comprises a second coupling part that is in contact with the bracket body at an other side of the bracket body and a second extension part extending from the second coupling part in the horizontal direction,
wherein one or more of the first extension part and the second extension part to define the contact surface.

7. The refrigerator of claim 6, wherein the bracket body comprises a through-hole,
the first coupling part comprises a coupling boss inserted into the through-hole, and
the second coupling part comprises a hole aligned with the coupling boss.

8. The refrigerator of claim 6, wherein the first coupling part is in contact with a top surface of the bracket body, and
the second coupling part is accommodated in an accommodation portion that is recessed from a bottom surface of the bracket body.

9. The refrigerator of claim 6, wherein the first extension part and the second extension part are coupled to each other by a coupling member in a state of being in contact with each other.

10. The refrigerator of claim 6, wherein, based on a virtual line that is perpendicular to the front surface of the cabinet and passes through the rotational center line of the door, the contact surface comprises:
a first surface inclined in a direction that is farther from the virtual line as the first surface is closer to the front surface of the cabinet;
a second surface inclined in a direction that is closer to the virtual line as the second surface is closer to the front surface of the cabinet; and
a third surface extending in a direction that is closer to the virtual line as the third surface is farther from the front surface of the cabinet.

11. The refrigerator of claim 10, wherein each of the first coupling part and the second coupling part comprises the first to third surfaces.

12. The refrigerator of claim 10, wherein, the contact portion of the lever is maintained in a state of being in contact with the third surface when the door is in a closed state.

13. The refrigerator of claim 3, wherein the bracket body comprises a recess portion that is recessed in a horizontal direction, and
the first cam body comprises a protrusion portion disposed in the recess portion.

14. The refrigerator of claim 1, wherein, based on a virtual line that is perpendicular to the front surface of the cabinet and passes through the rotational center line of the door, the contact surface comprises:
a first surface inclined in a direction that is farther from the virtual line as the first surface is closer to the front surface of the cabinet;
a second surface inclined in a direction that is closer to the virtual line as the second surface is closer to the front surface of the cabinet; and
a third surface extending in a direction that is closer to the virtual line as the third surface is farther away from the front surface of the cabinet.

15. The refrigerator of claim 1, wherein the lever rotates based on a rotational center line spaced apart from the rotational center line of the door.

* * * * *